Sept. 4, 1945.  H. R. FORNEY  2,384,244
AUTOMATIC TELESCOPIC DRAFT HITCH
Filed May 10, 1944
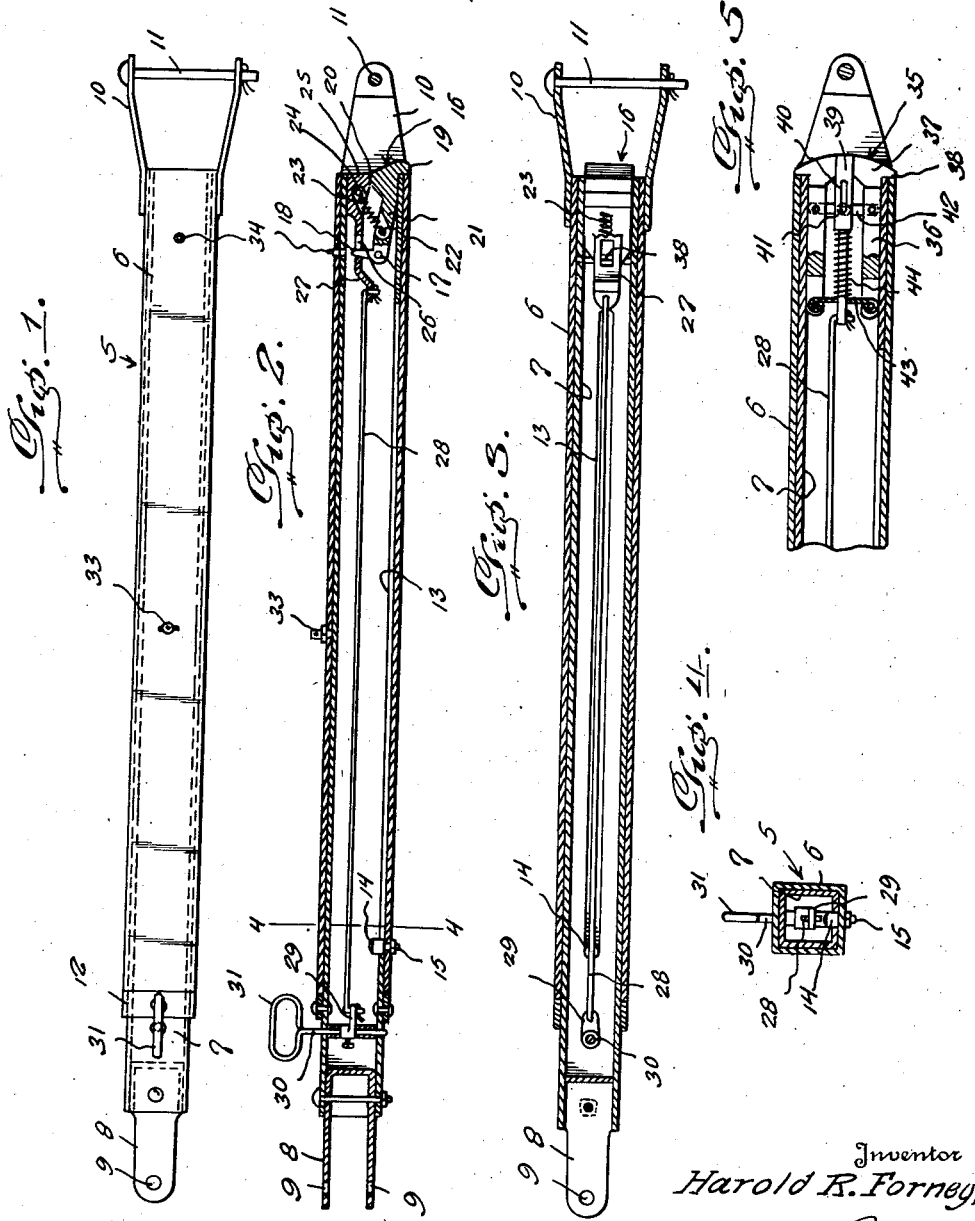
Inventor
Harold R. Forney, Patented Sept. 4, 1945

2,384,244

UNITED STATES PATENT OFFICE 2,384,244

AUTOMATIC TELESCOPIC DRAFT HITCH

Harold R. Forney, Surprise, Nebr.

Application May 10, 1944, Serial No. 534,908

6 Claims. (Cl. 280—33.14)

This invention relates to a trailer hitch of the type set forth in my U. S. Letters Patent No. 2,292,751.

The primary object of the invention is the provision of a hitch which will make the coupling of a trailer to a towing vehicle much simpler, quicker and easier on the operator and will eliminate the necessity of having to position the tractor an exact distance from the trailer before the coupling of the vehicles together may be accomplished.

Another object of this invention is the provision of a hitch of the above stated character which will permit the draft pole thereof to be easily adjusted as to length to facilitate the coupling thereof to the towing vehicle after being connected to the trailer and then automatically locked against lengthening or shortening by simply a movement of the towing vehicle in the direction of the trailer.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view illustrating an automatic telescopic draft hitch constructed in accordance with my invention.

Figure 2 is a vertical longitudinal sectional view illustrating the hitch.

Figure 3 is a horizontal longitudinal sectional view illustrating the hitch.

Figure 4 is a transverse sectional view taken on the line 4—4 of Figure 2.

Figure 5 is a fragmentary vertical longitudinal sectional view illustrating a modified form of my invention.

Referring in detail to the drawing, the numeral 5 indicates generally a telescopic draft pole or member including the sections 6 and 7 each of substantially rectangular shape in cross section with the section 7 slidably received within the section 6. The section 7 is slightly longer than the section 6 so as to normally protrude from one end of the latter a limited distance and has secured thereto a clevis 8 of substantially U shape. A portion of the U shaped clevis 8 is received within one end of the section 7 and is bolted or otherwise secured thereto. The clevis 8 has openings 9 to receive a coupling pin so that the clevis can be readily connected with a towing vehicle.

One end of the section 6 has secured thereto a clevis 10 including a removable bolt or pin 11. The clevis 10 permits the connecting and disconnecting of the composite draft pole or device 5 to a trailer or similar vehicle.

A collar or band 12 is riveted or otherwise secured to the section 7 adjacent the clevis 8 and acts as a stop by abutting one end of the section 6 to limit the distance in which the section 7 may slide into the section 6.

When the collar 12 is in abutting engagement with one end of the section 6, one end of the section 7 then will be in alignment with one end of the section 6, as shown to the right in Figure 2.

The section 7 has an elongated slot 13 in which is slidably fitted a lug 14 detachably secured to the section 7, as shown at 15. The purpose of the lug 14 operating in the slot 13 is to permit a certain amount of adjustment of the section 7 out of the section 6 and to check further movement of the section 7 when the lug engages with one end of the slot 13 to prevent complete separation of the sections 6 and 7.

A catch 16 engages the matched ends of the sections 6 and 7 when the section 7 is fully adjusted into the section 6 until the collar 12 abuts the section 6. This is clearly shown in Figure 2 and the catch is pivotally mounted in the section 7, as at 17, and has formed on its pivoted end an extension 18. The catch 16 includes a hook shaped end 19 which engages with the matched ends of the sections 6 and 7 and also includes an offset portion 20 and a shank portion 21 recessed, as at 22, in which is secured one end of a coil spring 23, the other end of the coil spring being connected in a recess 24 formed in a catch operating member 25 having a sliding fit with the walls of the section 7 and normally engages with the offset 20 to force the hook shaped end in a position of engaging the matched ends of the sections 6 and 7, as clearly shown in Figure 2. The operating member 25 has a slot 26 in a shank portion 27 thereof. A connecting link 28 located within the section 7 is pivotally connected to the shank 27 and to an arm 29 adjustably secured to an operating rod 30 journaled in the section 7 between the clevis 8 and the collar 12. The operating rod is provided with a hand grip 31.

When the latch 16 and operating member 25 are positioned, as shown in Figure 2, the section 7 will be secured against being withdrawn from the section 6. The draft pole is then in towing position.

To lengthen the draft pole or member 5, the operator turns the hand grip 31 which causes a sliding movement of the latch operating member 25 to disengage the latter from the offset 20 of the catch 16 and as the operating member moves off of the offset 20 the spring 23 acts to draw the catch 16 and operating member 25 in the direction of each other so that on further sliding movement of the operating member the hook shaped end 19 becomes disengaged from the matched ends of the sections 6 and 7 which will permit the section 7 then to slide to the left in Figures 1 and 2 for the purpose of lengthening the draft pole or member. This is desirable in coupling the clevis 8 to the towing vehicle after the clevis 10 has been applied to the trailer as the distance between the two vehicles may be such that the coupling cannot take place unless the overall length of the draft pole or member is increased. After the clevis 8 has been applied to the towing vehicle, the operator simply drives the towing vehicle rearwardly so that on the ends of the sections 6 and 7 coming into matched relation, the hook shaped end 19 of the catch 16 engages said ends and thereby automatically brings about locking of the draft pole or member in towing position. This will eliminate the necessity of maneuvering the towing vehicle to an exact position with relation to the trailer in order to couple the trailer to the towing vehicle.

When the rear ends of the sections 6 and 7 become matched or aligned by the movement of the towing vehicle rearwardly, the spring 23 being under tension acts to draw the operating member 25 rearwardly against the offset and thereby force the hook shaped end 19 of the catch 16 to engage said ends of the sections 6 and 7.

Further, it will be seen that this entire operation of unlatching the sections of the towing member can be accomplished by one hand of the operator.

A lubricant fitting 33 is carried by the section 6 whereby lubricant can be introduced onto the section 7 to bring about a thorough lubrication of the contacting faces of the sections 6 and 7 so that the section 7 will slide freely relative to the section 6, Matched openings are provided in the sections 6 and 7 and the opening in the section 6 only is screw threaded to receive a removable plug 34. When the sections 6 and 7 are latched together by the latch 16 the openings match and the plug 34 may be removed for the purpose of introducing a lubricant on the pivot of the latch and the connection of the extension 18 with the shank 27 of the latch holding member 25.

Referring to my modified form of the invention, as shown in Figure 5, another type of latch, indicated generally by the character 35, is provided for engaging the matched ends of the sections 6 and 7 of the draft pole or member and consists of a pair of latch members 36 arranged within the section 7 and provided with heads 37 each having a shoulder 38 to engage the matched ends of the sections 6 and 7.

An operating rod 39 is slidable between the latch members 36 and is pivotally connected to the link 28 and is provided with a slot 40 to receive a pivot pin 41 of links 32 which are pivoted to the latch members 36 adjacent the heads 37.

A plate 43 is pivotally connected to the latch members 36 and is provided with an opening to receive the operating rod 39. A coil spring 44 bears against a shoulder on the operating rod 39 and against the plate 43.

As shown in Figure 5, the sections 6 and 7 of the draft pole or member are latched together by the shoulders 38 overlapping the matched ends of the sections 6 and 7 with the operating rod interposed between opposing faces of the heads 37. A sliding movement of the operating rod 39 to the left in Figure 5 will first move the operating rod from between the heads 37 of the latch members 36 and a further movement of the latch rod will bring about compressing of the spring 44 and the drawing of the latch members in the direction of each other by the links 42 disengaging the shoulders 38 from the matched ends of the sections 6 and 7 of the draft pole or member so that the section 7 can be adjusted or pulled endwise of the section 6 for the purpose of lengthening the draft pole or member.

It is to be understood that the operating member 39 being connected to the rod 28 connects the operating member 39 to the operating rod 30.

The spring 44 will act to restore the heads 37 of the latch members 36 into engagement with the rear ends of the sections 6 and 7 when said ends are aligned.

While I have shown and described the preferred embodiment of my invention, it will be understood that minor changes in construction, combination and arrangement of parts may be made without departing from the spirit and scope of the invention as claimed.

What I claim is:

1. In a draft hitch, a draft pole including telescopic inner and outer tubular sections for lengthening and shortening of the pole, clevises secured to said sections one on the front end portion of the inner section for coupling thereof to a towing vehicle and the other on the rear end portion of the outer section for coupling thereof to a trailer, means for limiting the sliding of one section in one direction relative to the other section and for arranging the rear ends of said sections flush with each other, a latch engaging said flush rear ends of the sections and cooperating with said slide limiting means in securing the sections against sliding movement relative to each other and arranging the pole in towing position, and an operating means on the front portion of the inner section for said latch to disengage the latter from said flush rear ends of the sections whereby one section may be slid relative to the other section for lengthening the pole for coupling purposes.

2. In a draft hitch, a draft pole of telescopic construction for lengthening and shortening of the pole and providing thereto front inner and rear outer portions, clevises secured to said portions for coupling the front portion to a towing vehicle and for coupling the rear portion to a trailer, a stop on the front inner portion to engage the near outer portion for limiting the telescopic movement of the portions in shortening of the pole and for arranging the rear end of one portion flush with the rear end of the other portion, a latch to engage said flush rear ends of the portions and releasably securing said portions to prevent lengthening of the pole, and an operating means for the latch for the manual release thereof from said flush rear ends of the pole sections.

3. In a draft hitch, a draft pole of telescopic construction for lengthening and shortening of the pole and providing thereto front and rear portions, clevises secured to said portions for coupling the front portion to a towing vehicle and for coupling the rear portion to a trailer, a stop on the front portion to engage the rear portion for limiting the telescopic movement of the portions in shortening of the pole and for arranging one end of one portion flush with one end of the other portion, a latch pivotally mounted in the front portion and including a hook shaped part to engage with the ends of the front and rear portions for releasably securing said portions to prevent lengthening of the pole, an operating member carried by the front portion, and means for connecting the operating member to the latch.

4. In a draft hitch, a draft pole of telescopic construction for lengthening and shortening of the pole and providing thereto front and rear portions, clevises secured to said portions for coupling the front portion to a towing vehicle and for coupling the rear portion to a trailer, a stop on the front portion to engage the rear portion for limiting the telescopic movement of the portions in shortening of the pole and for arranging one end of one portion flush with one end of the other portion, a latch pivoted in the front portion and having a hook shaped portion to engage said flush ends of the portions for securing said portions to prevent lengthening of the pole, a member slidable in the front portion to engage and wedge the latch in locking position and having a slot, a tensioning spring connecting said member to said latch, an extension formed on the pivoted end of the latch and extending into the slot, an operating rod journaled in the front portion, an arm secured to the operating rod, and a link connecting the arm to said member.

5. In a draft hitch, a draft pole of telescopic construction for lengthening and shortening the pole and providing front and rear portions thereto, clevises secured to said portions, a stop on the front portion to engage the rear portion for limiting the telescopic movement of the portions in shortening of the pole and for arranging ends of said portions in flush relation with each other, a latch to engage said ends of the portions and pivotally mounted in the front portion, a member slidable in the front portion to engage the latch to retain the latter in latching position, a tensioning spring connecting the latch to said member, said member having a slot, an extension formed on the pivoted end of the latch and extending into the slot, and an operating means carried by the front portion and connected to said member for effecting sliding movement thereof.

6. In a draft hitch, a draft pole of telescopic construction for lengthening and shortening the pole and providing thereto front and rear portions, clevises secured to said portions, a stop on the front portion to engage the rear portion and for limiting the telescopic movement of the portions in shortening of the pole and for arranging ends of said portions in flush relation, an operating member slidable in the front member, a plate having said member slidable therethrough, latches pivoted to said plate and having hook shaped portions to engage said flush ends of the front and rear portions and engaged by said operating member, said operating member having a slot, links having pivotal and slidable connection with the slot and pivoted to the latch members, a spring acting on said slidable member and the plate, and an operating means carried by the front portion and connected to the operating member to effect disengagement of the latches from the matched ends of the front and rear portions.

HAROLD R. FORNEY.